(12) United States Patent
Hedman (10) Patent No.: US 12,234,896 B2
(45) Date of Patent: Feb. 25, 2025

(54) TRANSMISSION FOR A VEHICLE (71) Applicant: VOLVO TRUCK CORPORATION, Gothenburg (SE)

(72) Inventor: Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/212,254

(22) Filed: Jun. 21, 2023

(65) Prior Publication Data

US 2024/0060548 A1 Feb. 22, 2024

(30) Foreign Application Priority Data

Aug. 18, 2022 (EP) ..................................... 22191072

(51) Int. Cl.
*F16H 3/093* (2006.01)
*F16H 37/04* (2006.01)

(52) U.S. Cl.
CPC ........... *F16H 3/093* (2013.01); *F16H 37/043* (2013.01); *F16H 2003/0938* (2013.01); *F16H 2037/045* (2013.01)

(58) Field of Classification Search
CPC ................... F16H 3/093; F16H 37/043; F16H 2003/0938; F16H 2037/045
USPC .......................................................... 74/331
See application file for complete search history.

(56) References Cited

U.S. PATENT DOCUMENTS

| | | | |
|---|---|---|---|
| 3,138,965 A | 6/1964 | Brey et al. | |
| 7,171,867 B2 * | 2/2007 | McCrary | F16D 25/0638 74/331 |
| 7,409,886 B2 * | 8/2008 | Gitt | F16H 3/006 74/330 |
| 9,772,016 B2 * | 9/2017 | Forsberg | F16H 3/16 |
| 2006/0025272 A1 * | 2/2006 | Pelouch | F16H 37/046 475/214 |

(Continued)

FOREIGN PATENT DOCUMENTS

| | | |
|---|---|---|
| EP | 2873890 A | 5/2015 |
| JP | H03219152 A | 9/1991 |

(Continued)

OTHER PUBLICATIONS

Extended European Search Report, European Patent Application No. 22191072.2, mailed May 2, 2023, 13 pages.

*Primary Examiner* — Ha Dinh Ho (74) *Attorney, Agent, or Firm* — Sage Patent Group (57) ABSTRACT

A transmission for a vehicle includes: an input shaft, a main shaft, and a countershaft, the main shaft being coaxial with the input shaft and the countershaft being parallel therewith, first and second primary gear planes arranged for torque transfer between the input shaft and the countershaft, and at least one secondary gear plane arranged for torque transfer between the countershaft and the main shaft. The transmission further includes a crawler shaft arranged in parallel with the main shaft, wherein the first primary gear plane comprises a first crawler shaft gearwheel arranged on the crawler shaft, and wherein the second primary gear plane comprises a second crawler shaft gearwheel arranged on the crawler shaft, the second crawler shaft gearwheel being selectively rotationally connectable to the first crawler shaft gearwheel so as to engage a crawler gear of the transmission.

20 Claims, 8 Drawing Sheets

(56) References Cited

U.S. PATENT DOCUMENTS

| | | | |
|---|---|---|---|
| 2006/0117882 A1* | 6/2006 | Gitt | F16H 3/097 74/331 |
| 2010/0179024 A1* | 7/2010 | Holmes | B60K 6/36 903/917 |
| 2014/0256503 A1 | 9/2014 | Grant | |

FOREIGN PATENT DOCUMENTS

| | | | |
|---|---|---|---|
| WO | 2008115133 A1 | 9/2008 | |
| WO | 2021089126 A1 | 5/2021 | |

* cited by examiner

TRANSMISSION FOR A VEHICLE

CROSS REFERENCE TO RELATED APPLICATIONS

This application claims priority to European Patent Application No. 22191072.2, filed on Aug. 18, 2022, the disclosure and content of which is incorporated by reference herein in its entirety.

TECHNICAL FIELD

The present disclosure relates to a transmission, a transmission control unit, and a vehicle.

The present disclosure can be applied in heavy-duty vehicles, such as trucks, buses, and construction equipment. Although the present disclosure will be described with respect to a truck, the subject matter as claimed is not restricted to this type of vehicle, but may also be used in other vehicles such as buses, trailers, wheel loaders, excavators, etc.

BACKGROUND

Down-speeding of engines, i.e., operating the engine at a low rotational speed with high torque, generally improves drivability and reduces fuel consumption. In heavy-duty vehicles, down-speeding of the engine has therefore become increasingly common in order to save fuel and reduce emissions. Such down-speeding requires an increased gear ratio coverage in a transmission of the vehicle in order to maintain startability. Additional gears are therefore required. However, such additional gears risk to make the transmission longer, heavier, and more expensive. Furthermore, by increasing the length of shafts within the transmission, the shafts become weaker and more prone to deflection when loaded. In view of this, it would be desirable to achieve a length-neutral design of the transmission, in which optional additional gears may be provided.

SUMMARY

A primary object of the present disclosure is to provide a transmission for a vehicle which is in at least some aspect improved in comparison to conventional transmissions. In particular, it is an object to provide such a transmission which can provide additional gear ratios without increasing a length of the transmission, and which is suitable for use with a down-speeded engine. Another object is to provide such a transmission that does not require any additional housing modules or similar.

The object is achieved by a device/method according to claim 1. Hence, a transmission for a vehicle is provided, comprising:
an input shaft, a main shaft, and a countershaft, the main shaft being coaxial with the input shaft and the countershaft being parallel therewith,
first and second primary gear planes arranged for torque transfer between the input shaft and the countershaft, and
at least one secondary gear plane arranged for torque transfer between the countershaft and the main shaft.

The transmission further comprises a crawler shaft arranged in parallel with the main shaft, wherein the first primary gear plane comprises a first crawler shaft gearwheel arranged on the crawler shaft, and wherein the second primary gear plane comprises a second crawler shaft gearwheel arranged on the crawler shaft, the second crawler shaft gearwheel being selectively rotationally connectable to the first crawler shaft gearwheel so as to engage a crawler gear of the transmission.

By providing a crawler shaft arranged in parallel with the main shaft and arranging at least two gearwheels on the crawler shaft as described above, a relatively space-efficient transmission that can provide both forward and reverse crawler gears without adding to the length of the transmission housing is achieved. A "crawler gear" is to be understood as a low forward gear, with a speed reduction ratio that is larger than for the other gears of the transmission. A crawler gear is generally designed to be used infrequently, e.g., at low-speed manoeuvres or occasional up-hill start-offs.

The transmission is of splitter type, i.e., it comprises two primary gear planes for torque transfer between the input shaft and the countershaft. It further comprises one or more secondary gear planes for torque transmission between the countershaft and the main shaft. Each primary gear plane may comprise a respective input gearwheel which is selectively rotationally connectable to the input shaft using a primary gear engaging device. The primary gear engaging device in combination with crawler and countershaft gear engaging devices are used to select a torque path for torque transmission from the input shaft to the countershaft.

The transmission is configured such that, when a crawler gear is engaged, torque is transferred from the input shaft to the countershaft via an odd number of gear meshes, preferably three gear meshes, resulting in the countershaft and the input shaft rotating in opposite directions. The main shaft and the input shaft will thereby rotate in the same direction when torque is transferred from the countershaft to the main shaft via a single gear mesh. To engage a reverse gear, an additional gear mesh may be provided in a reverse secondary gear plane.

By a gearwheel being "arranged on" a shaft is intended a gearwheel being coaxial with the shaft, and arranged either rotatably on the shaft or permanently fixed thereto. When rotatably arranged, the gearwheel may be possible to rotationally connect to the shaft using a gear engaging device such as a sleeve or similar.

By the term "rotationally connected" is intended "connected for common rotation".

By a "driving connection" of two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rigidly connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

Optionally, the first primary gear plane comprises a first input gearwheel arranged coaxially with the input shaft, and a first countershaft gearwheel arranged on the countershaft, and the second primary gear plane comprises a second input gearwheel arranged coaxially with the input shaft, and a second countershaft gearwheel arranged on the countershaft. For example, the second input gearwheel may be arranged coaxially on the input shaft.

Optionally, the first crawler shaft gearwheel and the first countershaft gearwheel are in meshing engagement with one another, and the second crawler shaft gearwheel and the second countershaft gearwheel are in meshing engagement with one another. The transmission may herein be configured either as an overdrive transmission, with a top forward gear in which torque is transferred via the countershaft, or as a direct gear transmission, with a top forward gear being a direct gear.

Alternatively, the first crawler shaft gearwheel and the first input gearwheel are in meshing engagement with one another, and the second crawler shaft gearwheel and the second input gearwheel are in meshing engagement with one another. The transmission may herein be configured as a direct gear transmission, with a top forward gear being a direct gear, or as an overdrive transmission, with a top forward gear in which torque is transferred via the countershaft.

By a meshing engagement is herein intended a permanent meshing engagement.

In both of the above configurations, the transmission is configured such that an odd number of gear meshes, namely three gear meshes, are provided for transferring torque from the input shaft to the countershaft, resulting in the countershaft and the input shaft rotating in opposite directions. Hence, when a single gear mesh is used to transfer torque from the countershaft to the main shaft, a forward gear is achieved.

In some examples, one of the first and second countershaft gearwheels is rotationally fixed to the countershaft, and the other one of the first and second countershaft gearwheels is a rotatable countershaft gearwheel arranged rotatably on and selectively rotationally connectable to the countershaft. When the first crawler shaft gearwheel is not rotationally connected to the second crawler shaft gearwheel, torque can be transmitted between the input shaft and the main shaft without using the crawler shaft, i.e., with a smaller speed reduction than when using the crawler shaft. When the rotatable countershaft gearwheel is not rotationally connected to the countershaft, a crawler gear, using the crawler shaft for torque transfer, may be engaged.

In some examples, the transmission further comprises a crawler gear engaging device configured to selectively rotationally connect and disconnect the first and second crawler shaft gearwheels to/from one another, and a countershaft gear engaging device configured to selectively rotationally connect and disconnect the rotatable countershaft gearwheel to/from the countershaft.

In some examples, the countershaft gear engaging device is configured to rotationally connect the rotatable countershaft gearwheel to the countershaft only when the crawler gear engaging device is in a neutral position, and the crawler gear engaging device is configured to rotationally connect the first and second crawler shaft gearwheels to one another only when the countershaft gear engaging device is in a neutral position. In its neutral position, the countershaft gear engaging device rotationally disconnects the rotatable countershaft gearwheel from the countershaft so that it may rotate with respect thereto. Likewise, in its neutral position, the crawler gear engaging device rotationally disconnects the first and second crawler shaft gearwheels from one another, such as by rotationally disconnecting one of the crawler shaft gearwheels from the crawler shaft.

In some examples, the crawler and countershaft gear engaging devices are arranged to be movable in common by a single actuator, such as by being movable by two shift forks provided on a common shift rod, movable by a single actuator.

In some examples, the crawler and countershaft gear engaging devices are selectively movable to a common neutral position in which the first and second crawler shaft gearwheels are rotationally disconnected from one another and in which the rotatable countershaft gearwheel is rotationally disconnected from the countershaft.

Optionally, a number of gear teeth of the first crawler shaft gearwheel differs from a theoretical number of gear teeth of the first crawler shaft gearwheel by at least one gear tooth, such as by a number of 1-3 gear teeth, wherein the theoretical number of gear teeth is determined from a number of gear teeth of the first input gearwheel and of the first countershaft gearwheel, and from centre-to-centre distances between the gearwheels of the first primary gear plane.

In some examples, a number of gear teeth of the second crawler shaft gearwheel differs from a theoretical number of gear teeth of the second crawler shaft gearwheel by at least one gear tooth, such as by a number of 1-3 gear teeth, wherein the theoretical number of gear teeth is determined from a number of gear teeth of the second input gearwheel and of the second countershaft gearwheel, and from centre-to-centre distances between the gearwheels of the second primary gear plane.

In some examples, the number of gear teeth of the first crawler shaft gearwheel is smaller than the theoretical number of gear teeth of the first crawler shaft gearwheel, and the number of gear teeth of the second crawler shaft gearwheel is larger than the theoretical number of gear teeth of the second crawler shaft gearwheel. The rotatable countershaft gearwheel may herein preferably be located in the second primary gear plane. This configuration is beneficial when power flow from the input shaft to the countershaft, in a crawler gear, is via the second primary gear plane followed by the first primary gear plane when the vehicle is propelled. A relatively large number of gear teeth on the second crawler shaft gearwheel means that the crawler shaft will rotate relatively slowly, in comparison to a configuration with a smaller number of gear teeth. Hence, a larger speed reduction is possible. The relatively small number of gear teeth on the first crawler shaft gearwheel has the same effect.

Alternatively, the number of gear teeth of the first crawler shaft gearwheel is larger than the theoretical number of gear teeth of the first crawler shaft gearwheel, and the number of gear teeth of the second crawler shaft gearwheel is smaller than the theoretical number of gear teeth of the second crawler shaft gearwheel. The rotatable countershaft gearwheel may herein preferably be located in the first primary gear plane. This configuration is beneficial when power flow from the input shaft to the countershaft, in a crawler gear, is via the first primary gear plane followed by the second primary gear plane when the vehicle is propelled. In this case, it is beneficial with a relatively large number of gear teeth on the first crawler shaft gearwheel to obtain a large speed reduction at the crawler gear.

In some examples, the at least one secondary gear plane comprises at least a first secondary gear plane and a second secondary gear plane, and preferably a third secondary gear plane. The third secondary gear plane may be arranged for providing a reverse gear.

In some examples, the transmission further comprises a range gear configured to selectively drivingly connect the main shaft to an output shaft at a high range gear or a low range gear. The range gear may comprise a planetary gear set or a parallel shafts gear set.

According to a second aspect, a transmission control unit for controlling a transmission according to the first aspect is provided, the transmission comprising the countershaft gear engaging device. The transmission control unit is configured to control the countershaft gear engaging device to a neutral position when a direct forward gear of the transmission is engaged. This makes the countershaft and/or the rotatable countershaft gearwheel non-driven, i.e., drivingly disconnected from the input shaft. Hence, in the direct forward gear, splash losses resulting from rotation of the countershaft gearwheels in a wet sump of the transmission can be reduced by setting the countershaft gear engaging device to the neutral position. The transmission control unit may further comprise actuators and electronic circuitry for controlling the actuators and for communicating with other systems and control units of the vehicle, etc.

According to a third aspect, a vehicle comprising a transmission according to the first aspect is provided. The vehicle may further comprise a transmission control unit according to the second aspect. The vehicle may, e.g., be a heavy-duty vehicle such as a truck, a bus, or a working machine. The vehicle may be driven by a combustion engine and/or it may be a partly or fully electrified vehicle comprising one or more electric motors. Advantages and advantageous features of the vehicle according to the invention appear from the above description of the first aspect.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings:

FIG. 3 illustrates an exemplary power flow in the transmission in FIG. 2a;

FIG. 4 illustrates another exemplary power flow in the transmission in FIG. 2a;

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION

Figure 1:
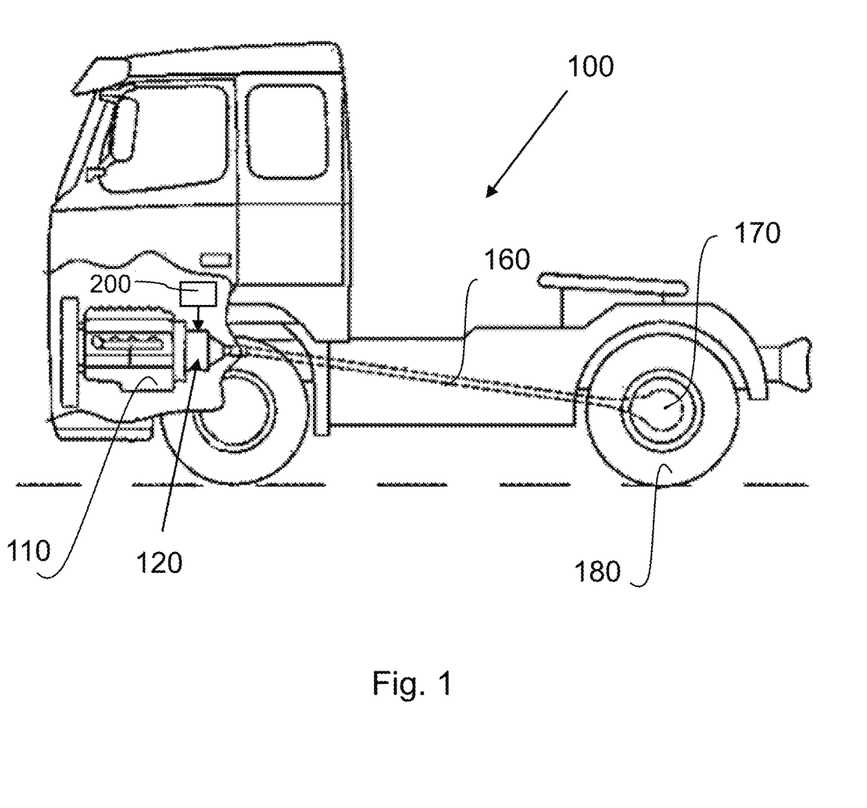
FIG. 1 schematically illustrates a vehicle according to an embodiment.

FIG. 1 depicts a vehicle 100 according to an example embodiment of an aspect of the present disclosure. The vehicle 100 is here a heavy-duty truck, more specifically a towing truck, or tractor, for pulling one or more trailers (not shown). As mentioned above, the vehicle may be any type of vehicle, including but not limited to buses, wheel loaders, excavators, passenger cars etc.

The vehicle 100 comprises a propulsion unit 110, which here is an internal combustion engine (ICE), and a transmission 120 according to an example embodiment of the invention drivingly connected or connectable to the propulsion unit 110. A transmission control unit 200 is provided for controlling the transmission 120. The transmission 120 is arranged to transfer torque from the propulsion unit 110 to a propeller shaft 160 connecting the transmission 120 to a driven axle 170 that drives driven wheels 180 of the vehicle 100. The driven wheels 180 are here rear wheels of the vehicle 100. Even though driven wheels 180 are shown in this embodiment, it shall be understood that any other type of ground engaging means may be used, such as crawler members of an excavator.

Of course, the vehicle may have many different configurations. By way of example, the vehicle may comprise one or more electric propulsion units in addition to, or instead of, the ICE. Furthermore, the transmission 120 does not need to be provided at a front of the vehicle, but may, e.g., be combined with a rear axle of the vehicle.

Figure 2A:
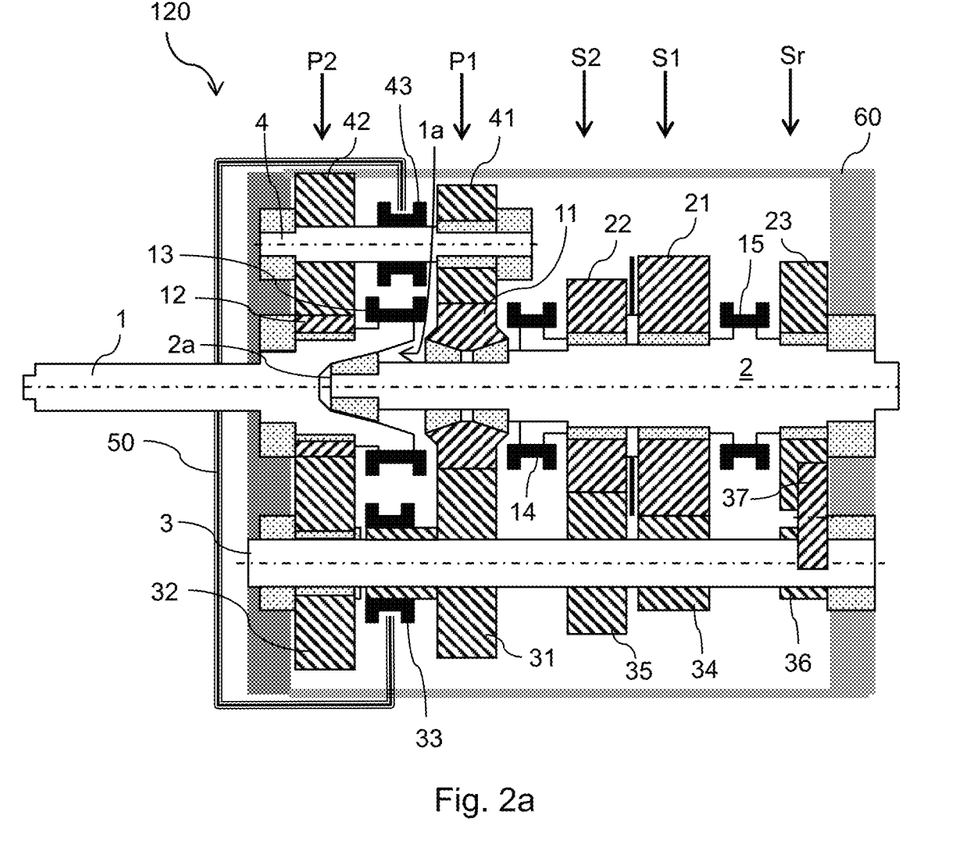
FIG. 2a schematically illustrates a transmission according to a first embodiment.

FIG. 2a illustrates a transmission 120 according to a first embodiment of the invention. The transmission 120 comprises an input shaft 1, drivingly connected or connectable to a propulsion unit such as the propulsion unit 110 (not illustrated in FIG. 2a). A main shaft 2 extends coaxially with the input shaft 1, a first end 2a of the main shaft 2 being rotatably received in a pocket 1a of the input shaft 1. A countershaft 3 and a crawler shaft 4 extend in parallel with one another and with the input shaft 1 and the main shaft 2. The shafts 1, 2, 3, 4 are mounted to a transmission housing 60 using bearings, shown as dotted areas in the figures.

The transmission 120 is a splitter type transmission, having two primary gear planes P1, P2 and several secondary gear planes S1, S2, Sr. Thus, first and second primary gear planes P1, P2 are arranged for torque transfer between the input shaft 1 and the countershaft 3. The first primary gear plane P1 comprises a first input gearwheel 11 arranged coaxially with the input shaft 1 and a first countershaft gearwheel 31, rotationally fixed on the countershaft 3. In the illustrated first embodiment, the first input gearwheel 11 is rotatably arranged on the main shaft 2. The first primary gear plane P1 further comprises a first crawler shaft gearwheel 41 rotatably arranged on the crawler shaft 4.

The second primary gear plane P2 comprises a second input gearwheel 12 arranged coaxially with the input shaft 1 and a second countershaft gearwheel 32 rotatably arranged on the countershaft 3. In the illustrated first embodiment, the second input gearwheel 12 is rotatably arranged on the input shaft 1. The second primary gear plane P2 further comprises a second crawler shaft gearwheel 42 arranged on and rotationally fixed to the crawler shaft 4.

In the first primary gear plane P1, the first crawler shaft gearwheel 41 and the first input gearwheel 11 are in meshing engagement with one another. The first input gearwheel 11 is further in meshing engagement with the first countershaft gearwheel 31. In the second primary gear plane P2, the second crawler shaft gearwheel 42 and the second input gearwheel 12 are in meshing engagement with one another. The second input gearwheel 12 is further in meshing engagement with the second countershaft gearwheel 32. The countershaft gearwheels 31, 32 are not in meshing engagement with the crawler shaft gearwheels 41, 42.

First, second and third secondary gear planes S1, S2, Sr are further arranged for torque transfer between the countershaft 3 and the main shaft 2, wherein the third secondary gear plane Sr is a reverse gear plane. The first, second and third secondary gear planes S1, S2, Sr comprise a first, second and third main gearwheel 21, 22, 23, respectively, rotatably arranged on the main shaft 2. The first, second and third secondary gear planes S1, S2, Sr further comprise a first, second and third secondary countershaft gearwheel 34, 35, 36, respectively, arranged on and rotationally fixed to the countershaft 3. The first and second main gearwheels 21, 22 are in meshing engagement with a respective one of the secondary countershaft gearwheels 35, 35. In the third secondary gear plane Sr, torque is instead transmittable via a reverse gearwheel 37, which is in meshing engagement with both of the third main gearwheel 23 and the third secondary countershaft gearwheel 36.

Of course, less than three or more than three secondary gear planes may be provided, such as one, two, or four secondary gear planes.

A first gear engaging device 13 is provided for selectively rotationally connecting one of the first input gearwheel 11 and the second input gearwheel 12 to the input shaft 1. The first gear engaging device 13 is movable between a first position (to the right) in which it rotationally connects the first input gearwheel 11 to the input shaft 1, a second position (to the left) in which it rotationally connects the second input gearwheel 12 to the input shaft 2, and a neutral position (middle), as illustrated in FIG. 2a, in which it rotationally disconnects both of the first and the second input gearwheels 11, 12 from the input shaft 1. The first gear engaging device 13 may also be movable between the first and second positions only, without being settable to a neutral position.

A second gear engaging device 14 is provided for selectively rotationally connecting one of the first input gearwheel 11 and the second main gearwheel 22 to the main shaft 2. In a neutral position, as illustrated in FIG. 2a, the second gear engaging device 14 rotationally disconnects both of the first input gearwheel 11 and the second main gearwheel 22 from the main shaft 2. A third gear engaging device 15 is provided for selectively rotationally connecting one of the first main gearwheel 21 and the third main gearwheel 23 to the main shaft 2. The third gear engaging device 15 is also settable to a neutral position, as illustrated in FIG. 2a.

The transmission 120 further comprises a crawler gear engaging device 43 for selectively rotationally connecting and disconnecting the first and second crawler shaft gearwheels 41, 42 to/from one another. The second crawler shaft gearwheel 42 is thereby selectively rotationally connectable to the first crawler shaft gearwheel 41 so as to engage a crawler gear of the transmission 120. Only when the crawler shaft gearwheels 41, 42 are rotationally connected, a crawler gear may be engaged, and torque may be transferred from the input shaft 1 to the main shaft 2 via the crawler shaft 4. In the illustrated embodiment, the crawler gear engaging device 43 rotationally connects and disconnects the first and second crawler shaft gearwheels 41, 42 to/from one another depending on an axial position of the reverse gear engaging device 43.

A countershaft gear engaging device 33 is provided for selectively rotationally connecting and disconnecting the rotatable second countershaft gearwheel 32 to/from the countershaft 3. When the countershaft gear engaging device 33 rotationally connects the second countershaft gearwheel 32 to the countershaft 3, torque may be transferred from the input shaft 1 to the main shaft 2 via the second primary gear plane P2 and the countershaft 3.

In the illustrated embodiment, the countershaft gear engaging device 33 and the crawler gear engaging device 43 are arranged to be movable in common by a single actuator 50, e.g., by being movable by two shift forks (not shown) provided on a common shift rod (not shown), movable by the single actuator 50. In this way, the countershaft gear engaging device 33 and the crawler gear engaging device 43 are movable in common between:

A first position, to the right in FIG. 2a, in which the crawler shaft gearwheels 41, 42 are rotationally connected to one another by the first crawler shaft gearwheel 41 being rotationally connected to the crawler shaft 4, and in which the first countershaft gearwheel 31 is rotationally disconnected from the second countershaft gearwheel 32. In the first position, the transmission 120 is configured for torque transmission at a crawler gear.

A second position, to the left in FIG. 2a, in which the crawler shaft gearwheels 41, 42 are rotationally disconnected from one another by the first crawler shaft gearwheel 42 being rotationally disconnected from the crawler shaft 4, and in which the first countershaft gearwheel 31 is rotationally disconnected from the second countershaft gearwheel 32.

A neutral position, in the middle between the first and second positions, in which the crawler shaft gearwheels 41, 42 as well as the first and second countershaft gearwheels 31, 32 are rotationally disconnected from one another. In this position, a direct forward gear may be engaged by means of the first and second gear engaging devices.

The gear engaging devices 13, 14, 15, 33, 43 may, e.g., be sleeve members that may be referred to as clutch sleeves, clutch collars, engaging sleeves, or similar. Gear shifting may be controlled from the transmission control unit 200 using, e.g., electric, hydraulic, or pneumatic actuators to move the shift forks.

Figure 3:
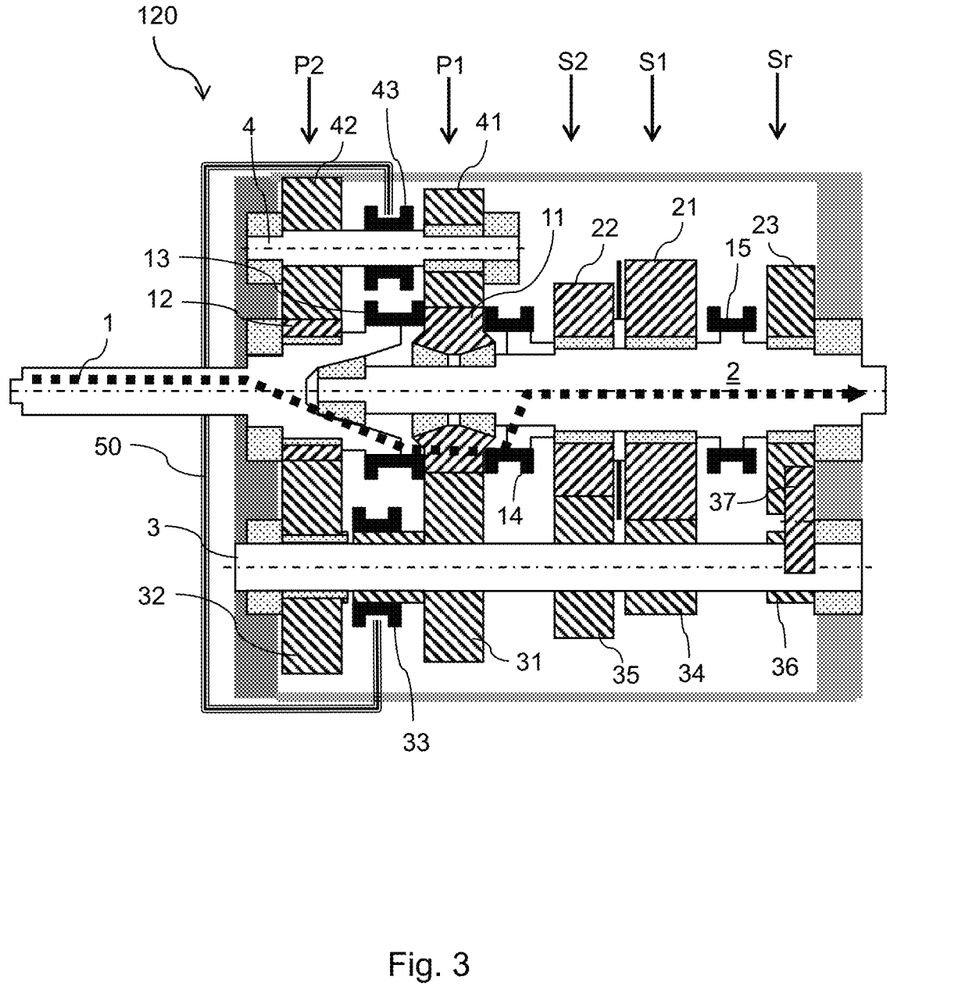
Figure 4:
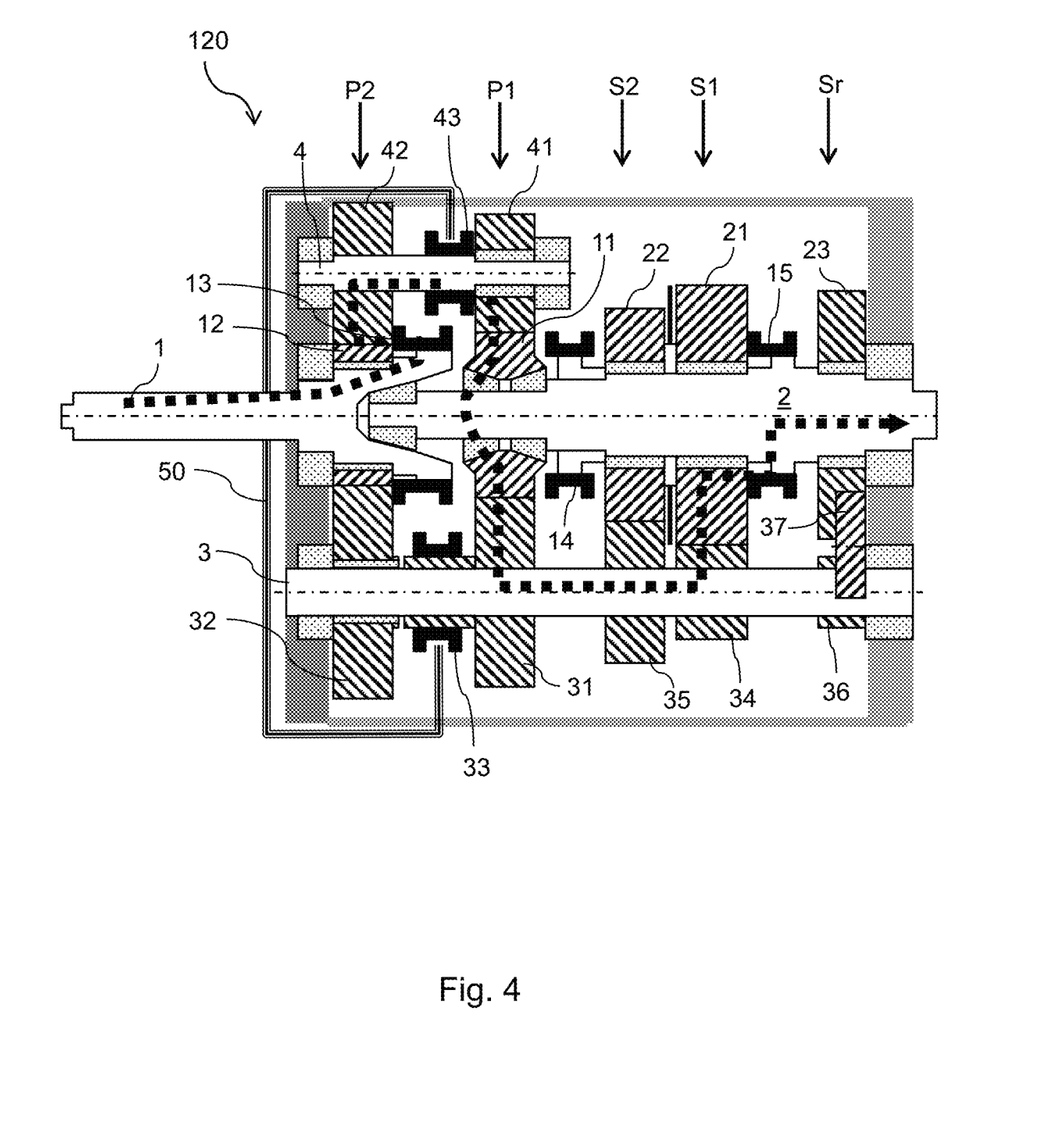

Power flows in a transmission 120 according to the first embodiment is schematically illustrated in FIGS. 3-4.

In FIG. 3, the transmission 120 is set to a top forward gear in the form of a direct forward gear by setting the first gear engaging device 13 to the first position and the second gear engaging device 14 to a second position, i.e., to the left. The third gear engaging device 15 as well as the countershaft gear engaging device 33 and the crawler gear engaging device 43 are set to the neutral positions, whereby the rotatable second countershaft gearwheel 32 and the second crawler shaft gearwheel 42 together with the crawler shaft 4 are not drivingly connected to the input shaft 1. Torque is transmitted from the input shaft 1 to the main shaft 2 via the first gear engaging device 13, the first input gearwheel 11, and the second gear engaging device 14, as illustrated by the dotted arrow. Since the second countershaft gearwheel 32 is rotationally disconnected from the countershaft, the rotation of the countershaft 3 resulting from the meshing engagement between the first countershaft gearwheel 31 and the first input gearwheel 11 does not imply any rotation of the relatively large second countershaft gearwheel 32. Hence, splash losses resulting from rotation of the second countershaft gearwheel 32 in a wet sump (not shown) of the transmission 120 are avoided.

In FIG. 4, a crawler gear of the transmission 120 is engaged by setting the first gear engaging device 13 to its second position, i.e., to the left, the second gear engaging device 14 to a neutral position, and the countershaft gear engaging device 33 and the crawler gear engaging device 43 to the common first position described above. Hence, torque is transferred from the input shaft 1 to the main shaft 2 via the crawler shaft 4 and the countershaft 3, as illustrated by the dotted arrow. More specifically, the torque is transferred from the input shaft 1 to the countershaft 3 via the first gear engaging device 13, the second input gearwheel 12, the second crawler shaft gearwheel 42, the crawler shaft 4, the crawler gear engaging device 43, the first crawler shaft gearwheel 41, the first input gearwheel 11, and the first countershaft gearwheel 31. In other words, torque is transmitted from the input shaft 1 to the countershaft 3 in the order of the second primary gear plane P2 followed by the first primary gear plane P1 via three gear meshes.

The torque is further transferred from the countershaft 3 to the main shaft 2 via the first secondary gear plane S1, i.e., via the first secondary countershaft gearwheel 34, the first main shaft gearwheel 21 and the third gear engaging device 15. If instead a reverse crawler gear is to be engaged, the third gear engaging device 15 may be set to a first position, i.e., to the right, in which case torque is instead transferred from the countershaft 3 to the main shaft 2 via the third secondary gear plane Sr, i.e., via the third secondary countershaft gearwheel 36, the reverse gearwheel 37, the third main shaft gearwheel 23 and the third gear engaging device 15.

Figure 2B:
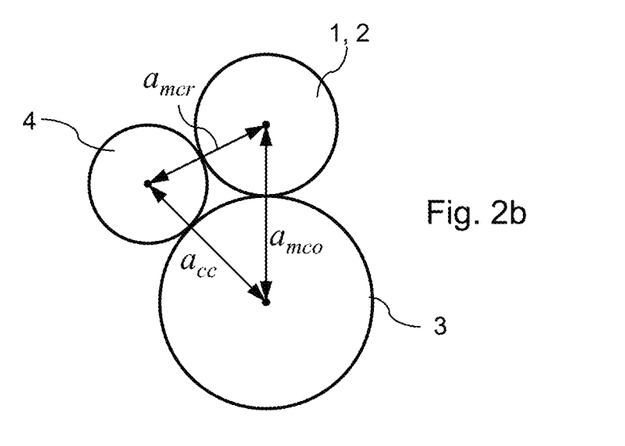
FIG. 2b schematically illustrates the shafts of the transmission of FIG. 2a in a side view.

FIG. 2b schematically illustrates the input shaft 1 and the main shaft 2, the countershaft 3 and the crawler shaft 4 in a side view, i.e., in a plane perpendicular to longitudinal axes of the shafts 1, 2, 3, 4. FIG. 2b illustrates a first centre-to-centre distance $a_{mcr}$ between on the one hand the input shaft 1 and the main shaft 2 and on the other hand the crawler shaft 4, a second centre-to-centre distance $a_{mco}$ between on the one hand the input shaft 1 and the main shaft 2 and on the other hand the countershaft 3, and a third centre-to-centre distance $a_{cc}$ between the crawler shaft 4 and the countershaft 3. In each primary gear plane P1, P2, a theoretical number of gear teeth $z_{41,th}$, $z_{42,th}$ on the crawler shaft gearwheels 41, 42 can be determined from the centre-to-centre distances $a_{mcr}$, $a_{mco}$, $a_{cc}$ and a known number of gear teeth $z_{11}$, $z_{12}$ of the input gearwheels 11, 12 and a known number of gear teeth $z_{31}$, $z_{32}$ of the countershaft gearwheels 31, 32 from Equations 1 and 2 below:

$$\frac{a_{mco}}{a_{mco}} = \frac{Z_{41,th} + Z_{11}}{Z_{31} + Z_{11}} \quad \text{(Eq. 1)}$$

$$\frac{a_{mcr}}{a_{mco}} = \frac{Z_{42,th} + Z_{12}}{Z_{32} + Z_{12}} \quad \text{(Eq. 2)}$$

The theoretical number of gear teeth is not necessarily an integer. In the first embodiment, an actual number of gear teeth of the first crawler shaft gearwheel 41 should preferably be smaller than the theoretical number of gear teeth of the first crawler shaft gearwheel 41, and an actual number of gear teeth of the second crawler shaft gearwheel 42 should be larger than the theoretical number of gear teeth of the second crawler shaft gearwheel 42. This enables a larger gear ratio when using the crawler shaft 41 for torque transfer, going from the second primary gear plane P2 to the first primary gear plane P1 as illustrated in FIG. 4. For each primary gear plane P1, P2, a difference between the theoretical number and the actual number should preferably be at least one gear tooth, such as 1-3 gear teeth.

Figure 5:
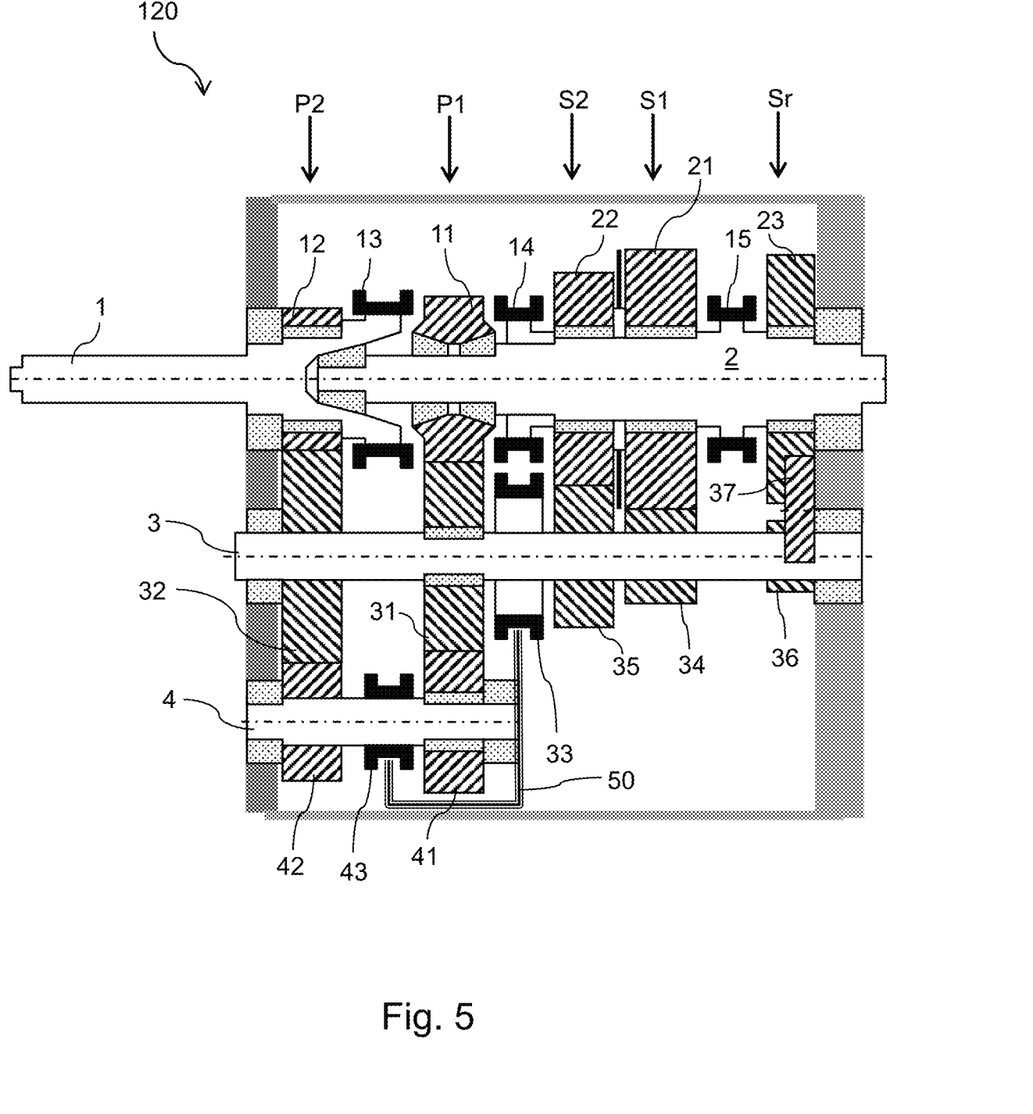
FIG. 5 schematically illustrates a transmission according to a second embodiment.

A transmission 120 according to a second embodiment is illustrated in FIG. 5. The transmission 120 according to the second embodiment differs from the first embodiment in that, in the first primary gear plane P1, the first countershaft gearwheel 31 is in meshing engagement with both of the first input gearwheel 11 and the first crawler shaft gearwheel 41, and in the second primary gear plane P2, the second countershaft gearwheel 32 is in meshing engagement with both of the second input gearwheel 12 and the second crawler shaft gearwheel 42. The input gearwheels 11, 12 are not in meshing engagement with the crawler shaft gearwheels 41, 42. Furthermore, the first countershaft gearwheel 31 as well as the first crawler shaft gearwheel 41 are rotatably arranged on their respective shafts 3, 4, while the second countershaft gearwheel 32 and the second crawler shaft gearwheel 42 are rotationally fixed on the respective shafts 3, 4. The countershaft gear engaging device 33 and the crawler gear engaging device 43 are movable in common using a common actuator 50. They are movable between a first position, to the right, in which the crawler shaft gearwheels 41, 42 are rotationally connected while the countershaft gearwheels 31, 32 are rotationally disconnected from one another; a second position, to the left, in which the crawler shaft gearwheels 41, 42 are rotationally disconnected from one another while the countershaft gearwheels 31, 32 are rotationally connected; and a neutral position in which the crawler shaft gearwheels 41, 42 as well as the first and second countershaft gearwheels 31, 32 are rotationally disconnected from one another.

Figure 6:
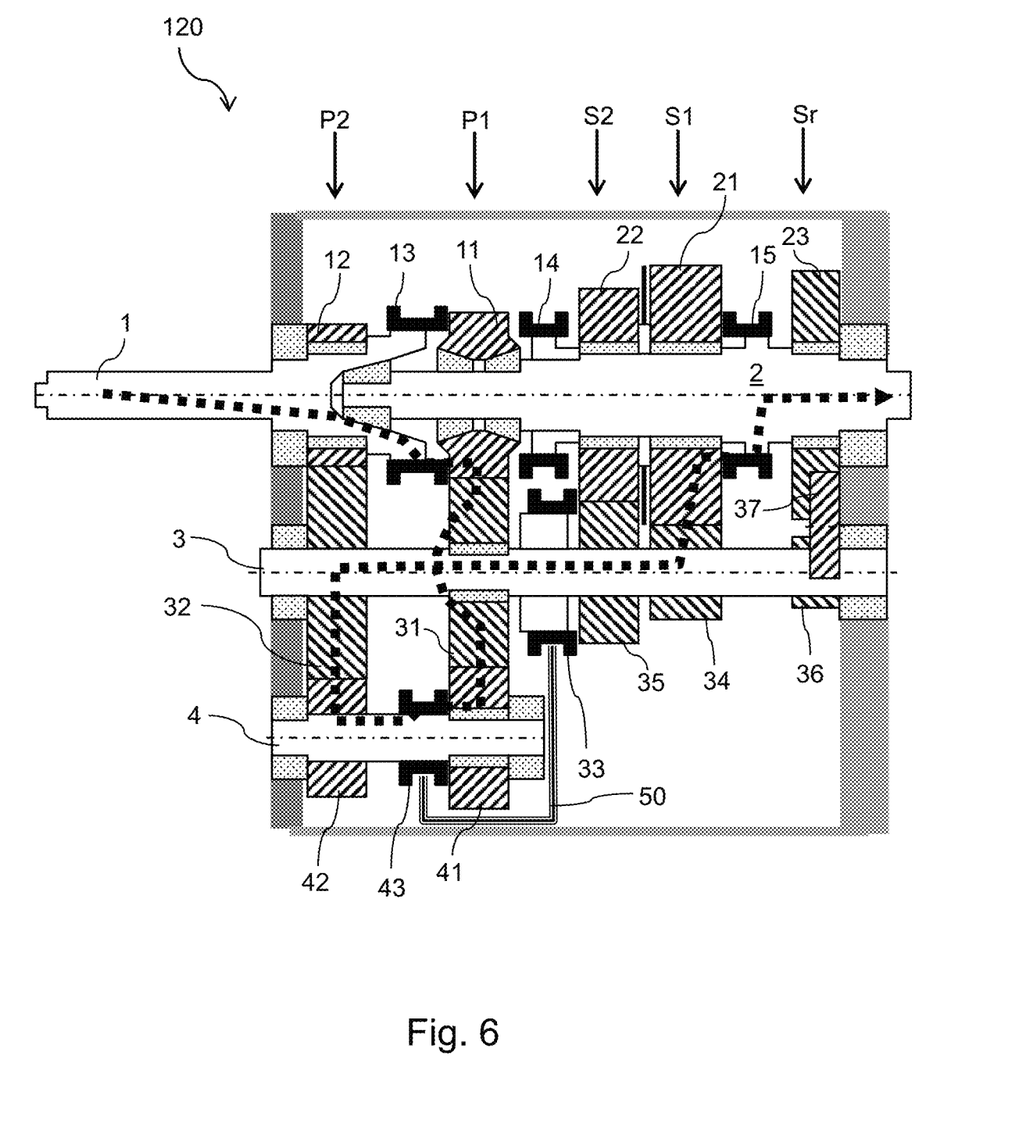
FIG. 6 illustrates an exemplary power flow in the transmission in FIG. 5.

FIG. 6 illustrates power flow through the transmission 120 according to the second embodiment when a crawler gear is engaged. The crawler gear is obtained by setting the first gear engaging device 13 to its first position to the right, the second gear engaging device 14 to a neutral position, and the countershaft gear engaging device 33 and the crawler gear engaging device 43 are set to the common first position described above. Hence, torque is transmitted from the input shaft 1 to the countershaft 3 via the first primary gear plane P1 followed by the second primary gear plane P2, using three gear meshes, as illustrated by the dotted arrow. More specifically, the torque is transferred from the input shaft 1 to the countershaft 3 via the first gear engaging device 13, the first input gearwheel 11, the first countershaft gearwheel 31, the first crawler shaft gearwheel 41, the crawler gear engaging device 43, the crawler shaft 4, the second crawler shaft gearwheel 42, and the second countershaft gearwheel 32. Torque transmission from the countershaft 3 to the main shaft 2 is as described in connection with the first embodiment.

In the second embodiment illustrated in FIG. 5, a direct forward gear may be achieved in the same way as in the first embodiment illustrated in FIG. 3. The common actuator 50 may in the direct forward gear set the countershaft gear engaging device 33 and the crawler gear engaging device 43 to a common neutral position, in which neither of the second countershaft gearwheel 32 and the crawler shaft 4 rotates. Furthermore, the countershaft 3 and the secondary countershaft gearwheels 34, 35, 36 rotationally connected thereto are not driven in this configuration.

In the second embodiment, an actual number of gear teeth of the first crawler shaft gearwheel 41 should preferably be larger than the theoretical number of gear teeth of the first crawler shaft gearwheel 41, and an actual number of gear teeth of the second crawler shaft gearwheel 42 should preferably be smaller than the theoretical number of gear teeth of the second crawler shaft gearwheel 42. In each primary gear plane P1, P2, the theoretical number of gear teeth $z_{41,th}$, $z_{42,th}$ on the crawler shaft gearwheels 41, 42 can in the third embodiment be determined from the centre-to-centre distances $a_{mcr}$, $a_{mco}$, $a_{cc}$ (see FIG. 2b) and a known number of gear teeth $z_{11}$, $z_{12}$ of the input gearwheels 11, 12 and a known number of gear teeth $z_{31}$, $z_{32}$ of the countershaft gearwheels 31, 32 from equations 3 and 4 below:

$$\frac{a_{cc}}{a_{mco}} = \frac{z_{41,th} + z_{31}}{z_{11} + z_{31}} \quad \text{(Eq. 3)}$$

$$\frac{a_{cc}}{a_{mco}} = \frac{z_{42,th} + z_{32}}{z_{12} + z_{32}} \quad \text{(Eq. 4)}$$

Figure 7:
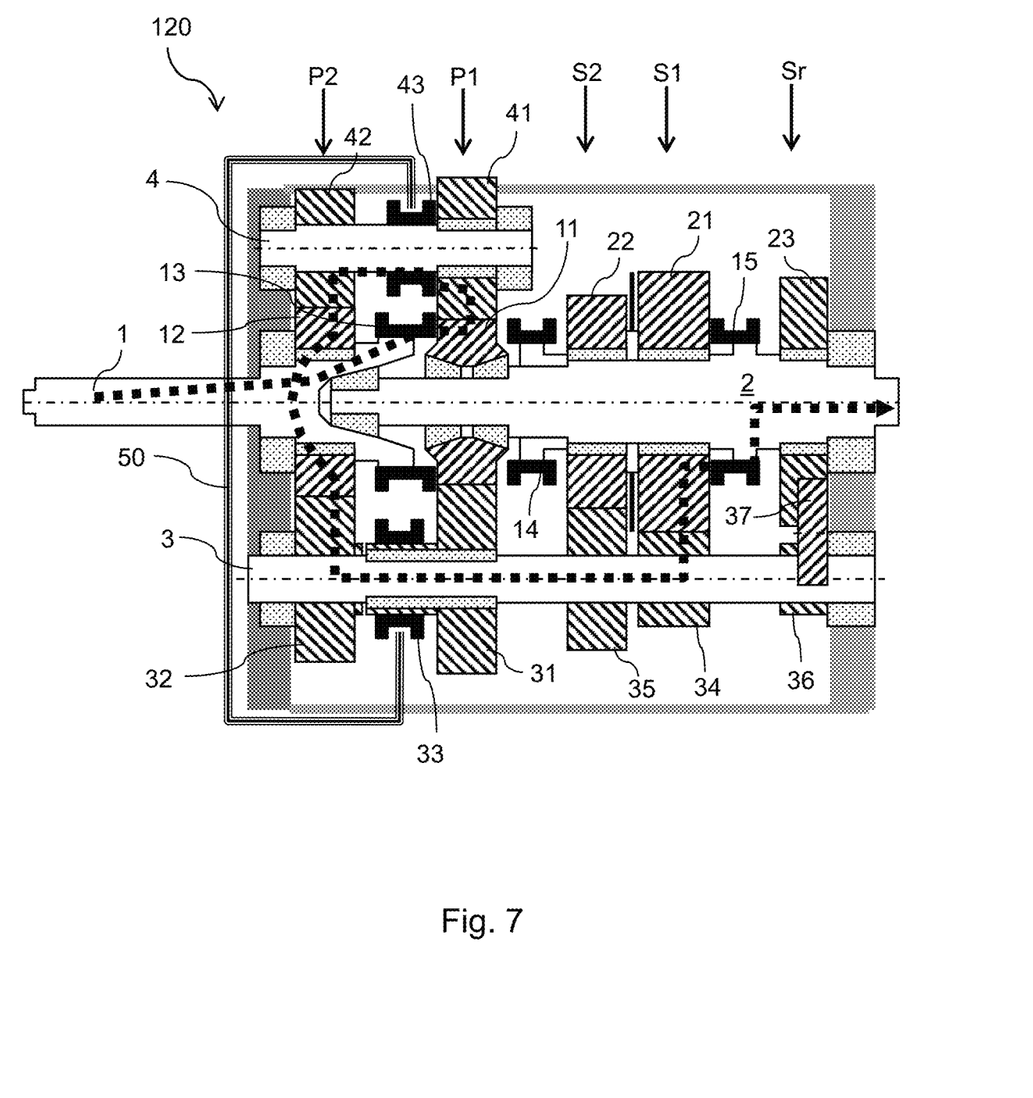
FIG. 7 schematically illustrates a transmission according to a third embodiment, and FIG. 8 schematically illustrates a transmission according to a fourth embodiment.

A transmission according to a third embodiment is illustrated in FIG. 7. The transmission 120 according to the third embodiment is an overdrive transmission and differs from the first embodiment in the configuration of the primary gear planes P1, P2. In the first primary gear plane P1, the first countershaft gearwheel 31 is rotatably arranged on the countershaft 3, and the first crawler shaft gearwheel 41 is rotatably arranged on the crawler shaft 4. In the second gear plane P2, the second countershaft gearwheel 32 is rotationally fixed on the countershaft 3, and the second crawler shaft gearwheel 42 is rotationally fixed on the crawler shaft 4. In similar with the first embodiment, the first crawler shaft gearwheel 41 and the first input gearwheel 11 are in meshing engagement with one another. The first input gearwheel 11 is further in meshing engagement with the first countershaft gearwheel 31. The second crawler shaft gearwheel 42 and the second input gearwheel 12 are in meshing engagement with one another. The second input gearwheel 12 is further in meshing engagement with the second countershaft gearwheel 32.

In the transmission 120 according to the third embodiment illustrated in FIG. 7, a top forward gear can be achieved by rotationally connecting the first input gearwheel 11 to the main shaft 2 and the second input gearwheel 12 to the input shaft 1, i.e., by setting both the first gear engaging device 13 and the second gear engaging device 14 to their second positions, i.e., to the left, while setting the crawler gear engaging device 43 to a position in which it does not rotationally connect the first crawler shaft gearwheel 41 to the crawler shaft 4, and setting the countershaft gear engaging device 33 to a position in which it rotationally connects the first countershaft gearwheel 31 to the second countershaft gearwheel 32 and to the countershaft 3. In other words, the common actuator 50 may be set to its second position to the left. In the top forward gear, torque is transmitted from the input shaft 1 to the main shaft 2 via the second primary gear plane P2 followed by the first primary gear plane P1, i.e., via two gear meshes.

The transmission 120 according to the third embodiment can also be set to a direct forward gear, providing a larger speed reduction than the top forward gear. To set the transmission 120 to the direct forward gear, the first gear engaging device 13 is set to a first position, i.e. to the right, and the second gear engaging device 14 is set to a second position, i.e., to the left. The third gear engaging device 15 as well as the countershaft gear engaging device 33 and the crawler gear engaging device 43 are set to the neutral positions, whereby the countershaft 3 and the gearwheels 32, 34, 35, 36 that are fixed thereon are not drivingly connected to the input shaft 1.

A crawler gear can in the third embodiment be achieved by setting the first gear engaging device 13 to its first position and the common actuator 50 to the first position, in which it rotationally connects the first crawler shaft gearwheel 41 to the crawler shaft 4 and rotationally disconnects the first countershaft gearwheel 31 from the countershaft 3. The second gear engaging device 14 is set to its neutral position. The third gear engaging device 15 is set to its second position, i.e., to the left. This configuration is illustrated in FIG. 7. Torque is hereby transferred from the input shaft 1 to the countershaft 3 via the first gear plane P1 followed by the second gear plane P2 using three gear meshes as illustrated by the dotted arrow.

In the third embodiment, an actual number of gear teeth of the first crawler shaft gearwheel 41 should preferably be larger than the theoretical number of gear teeth of the first crawler shaft gearwheel 41, and an actual number of gear teeth of the second crawler shaft gearwheel 42 should preferably be smaller than the theoretical number of gear teeth of the second crawler shaft gearwheel 42. The theoretical numbers of gear teeth are determined using Equations 1 and 2, as explained in connection with the first embodiment.

Figure 8:
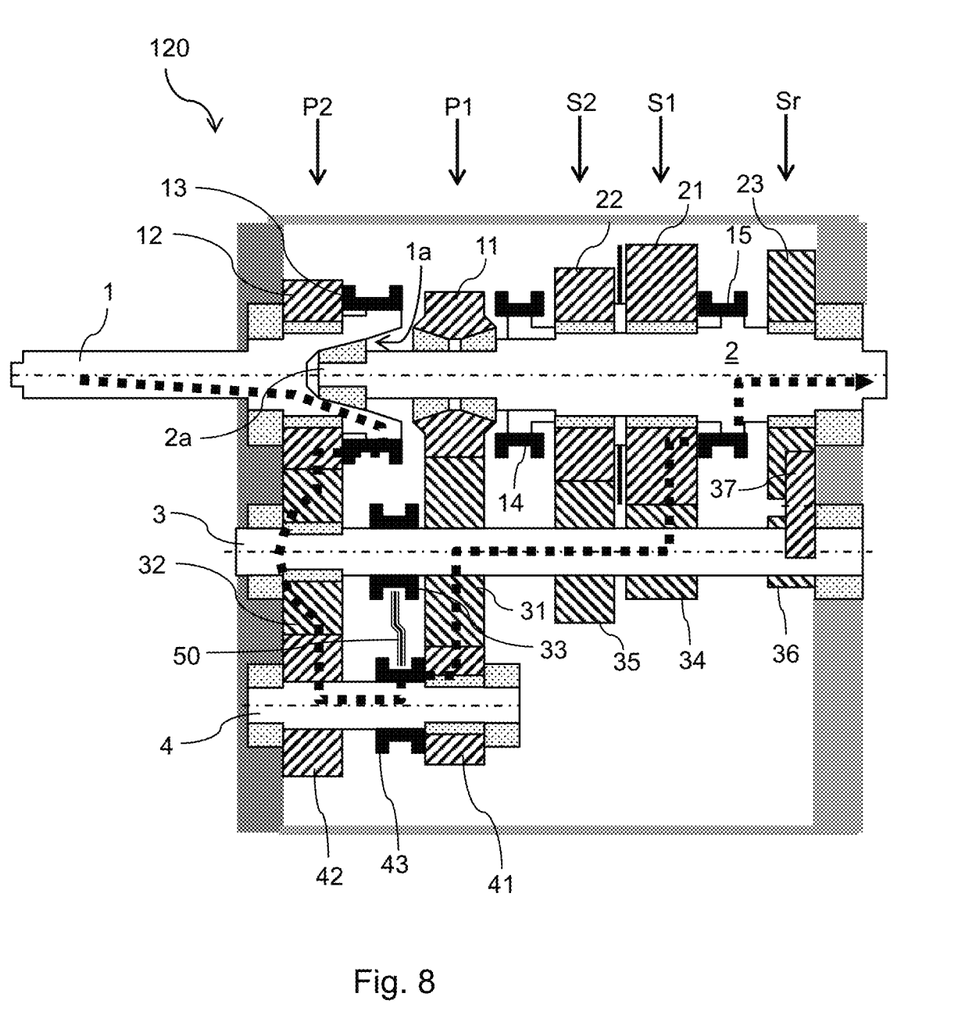

A transmission 120 according to a fourth embodiment is illustrated in FIG. 8. This embodiment is similar to the third embodiment and differs therefrom in that in the first primary gear plane P1, the first countershaft gearwheel 31 is in meshing engagement with both of the first input gearwheel 11 and the first crawler shaft gearwheel 41, and in the second primary gear plane P2, the second countershaft gearwheel 32 is in meshing engagement with both of the second input gearwheel 12 and the second crawler shaft gearwheel 42. The input gearwheels 11, 12 are not in meshing engagement with the crawler shaft gearwheels 41, 42. Furthermore, the first countershaft gearwheel 31 as well as the second crawler shaft gearwheel 42 are rotationally fixed on their respective shafts 3, 4, while the second countershaft gearwheel 32 and the first crawler shaft gearwheel 41 are rotatably arranged on the respective shafts 3, 4. The countershaft gear engaging device 33 and the crawler gear engaging device 43 are movable in common using a common actuator 50. They are movable between a first position, to the right, in which the crawler shaft gearwheels 41, 42 are rotationally connected while the countershaft gearwheels 31, 32 are rotationally disconnected from one another; a second position, to the left, in which the crawler shaft gearwheels 41, 42 are rotationally disconnected from one another while the countershaft gearwheels 31, 32 are rotationally connected; and a neutral position in which the crawler shaft gearwheels 41, 42 as well as the first and second countershaft gearwheels 31, 32 are rotationally disconnected from one another.

A crawler gear can in the fourth embodiment be achieved by setting the first gear engaging device 13 to its second position to the left, the second gear engaging device 14 to its neutral position, and the third gear engaging device 15 to the second position to the left. The common actuator 50 is used to set the countershaft gear engaging device 33 and the crawler gear engaging device 43 to the first position. This configuration is illustrated in FIG. 8. Power flows from the input shaft 1 to the countershaft 3 via the second primary gear plane P2 followed by the first primary gear plane P1 using three gear meshes, as illustrated by the dotted arrow.

The transmission 120 according to the fourth embodiment can also be set to a direct forward gear in the same way as described above for the third embodiment, providing a larger speed reduction than a top forward gear. The common actuator 50 may in the direct forward gear set the countershaft gear engaging device 33 and the reverse gear engaging device 43 to a common neutral position. In the top forward gear, the first and second gear engaging devices 13, 14 are set to their respective second positions to the left, and the common actuator 50 sets the countershaft gear engaging device 33 and the reverse gear engaging device 43 to the second position, to the left. Power flows in the top forward gear via the countershaft 3.

In the fourth embodiment, it is beneficial to provide an actual number of gear teeth on the first crawler shaft gearwheel 41 which is smaller than the theoretical number of gear teeth, and an actual number of gear teeth on the second crawler shaft gearwheel 42 which is larger than the theoretical number of gear teeth. The theoretical numbers of gear teeth may be determined from equations 3 and 4 as described in connection with the second embodiment.

The transmission control unit 200 is configured for controlling the transmission 120, in particular for controlling the gear engaging devices 13, 14, 15, 33, 43. The transmission control unit 200 is configured to control the countershaft gear engaging device 33 to a neutral position when a direct forward gear of the transmission 120 according to any one of the illustrated embodiments is engaged. This drivingly disconnects the countershaft 3 or the rotatable countershaft gearwheel from the input shaft 1. In the illustrated embodiments, this thereby reduces splash losses that would otherwise result from rotation of those parts.

The transmission control unit 200 may be an electronic control unit including a microprocessor, a microcontroller, a programmable digital signal processor or another programmable device. Thus, the transmission control unit 200 comprises electronic circuits and connections (not shown) as well as processing circuitry (not shown) such that the transmission control unit 200 can communicate with different parts of the vehicle 100 or with different control units of the vehicle 100, such as with various sensors, systems and control units, in particular with one or more electronic control units (ECUs) controlling electrical systems or subsystems in the vehicle 100, such as an engine control unit of the vehicle 100. The transmission control unit 200 may comprise modules in either hardware or software, or partially in hardware or software, and communicate using known transmission buses such a CAN-bus and/or wireless communication capabilities. The processing circuitry may be a general-purpose processor or a specific processor. The transmission control unit 200 may comprise a non-transitory memory for storing computer program code and data. Thus, the skilled person realizes that the transmission control unit 200 may be embodied by many different constructions. Although herein illustrated as a single unit, the transmission control unit 200 may be formed of several different control units configured to communicate with each other. The transmission control unit 200 may further comprise actuators, such as electric, pneumatic, or hydraulic actuators for controlling the gear engaging devices 13, 14, 15, 33, 43, and electronic circuitry for controlling the actuators and for communicating with other systems and control units of the vehicle 100, etc. For example, the common actuator 50 may form part of the transmission control unit 200 or be controlled thereby.

In all illustrated embodiments, a range gear (not shown) may be provided for drivingly connecting the main shaft 2 to an output shaft (not shown) at one of at least two gear ratios. The range gear may, purely by way of example, comprise a planetary gear set.

It is to be understood that the present invention is not limited to the embodiments described above and illustrated in the drawings; rather, the skilled person will recognize that many changes and modifications may be made within the scope of the appended claims.

The invention claimed is:

1. A transmission for a vehicle, comprising:
an input shaft, a main shaft, and a countershaft, the main shaft being coaxial with the input shaft and the countershaft being parallel therewith;
first and second primary gear planes arranged for torque transfer between the input shaft and the countershaft; and
at least one secondary gear plane arranged for torque transfer between the countershaft and the main shaft,
wherein the transmission further comprises a crawler shaft arranged in parallel with the main shaft, wherein the first primary gear plane comprises a first crawler shaft gearwheel arranged on the crawler shaft, and wherein the second primary gear plane comprises a second crawler shaft gearwheel arranged on the crawler shaft, the second crawler shaft gearwheel being selectively rotationally connectable to the first crawler shaft gearwheel so as to engage a crawler gear of the transmission.

2. The transmission according to claim 1, wherein:
the first primary gear plane comprises a first input gearwheel arranged coaxially with the input shaft, and a first countershaft gearwheel arranged on the countershaft; and
the second primary gear plane comprises a second input gearwheel arranged coaxially with the input shaft, and a second countershaft gearwheel arranged on the countershaft.

3. The transmission according to claim 2, wherein the first crawler shaft gearwheel and the first countershaft gearwheel are in meshing engagement with one another, and wherein the second crawler shaft gearwheel and the second countershaft gearwheel are in meshing engagement with one another, or
wherein the first crawler shaft gearwheel and the first input gearwheel are in meshing engagement with one another, and wherein the second crawler shaft gearwheel and the second input gearwheel are in meshing engagement with one another.

4. The transmission according to claim 2, wherein one of the first and second countershaft gearwheels is rotationally fixed to the countershaft, and the other one of the first and second countershaft gearwheels is a rotatable countershaft gearwheel arranged rotatably on and selectively rotationally connectable to the countershaft.

5. The transmission according to claim 4, further comprising a crawler gear engaging device configured to selectively rotationally connect and disconnect the first and second crawler shaft gearwheels to/from one another, and a countershaft gear engaging device configured to selectively rotationally connect and disconnect the rotatable countershaft gearwheel to/from the countershaft.

6. The transmission according to claim 5, wherein the countershaft gear engaging device is configured to rotationally connect the rotatable countershaft gearwheel to the countershaft only when the crawler gear engaging device is in a neutral position, and wherein the crawler gear engaging device is configured to rotationally connect the first and second crawler shaft gearwheels to one another only when the countershaft gear engaging device is in a neutral position.

7. The transmission according to claim 5, wherein the crawler and countershaft gear engaging devices are arranged to be movable in common by a single actuator.

8. The transmission according to claim 5, wherein the crawler and countershaft gear engaging devices are selectively movable to a common neutral position in which the first and second crawler shaft gearwheels are rotationally disconnected from one another and in which the rotatable countershaft gearwheel is rotationally disconnected from the countershaft.

9. The transmission according to claim 2, wherein a number of gear teeth of the first crawler shaft gearwheel differs from a theoretical number of gear teeth of the first crawler shaft gearwheel by at least one gear tooth, wherein the theoretical number of gear teeth is determined from a number of gear teeth of the first input gearwheel and of the first countershaft gearwheel, and from centre-to-centre distances between the gearwheels of the first primary gear plane.

10. The transmission according to claim 2, wherein a number of gear teeth of the second crawler shaft gearwheel differs from a theoretical number of gear teeth of the second crawler shaft gearwheel by at least one gear tooth, wherein the theoretical number of gear teeth is determined from a number of gear teeth of the second input gearwheel and of the second countershaft gearwheel, and from centre-to-centre distances between the gearwheels of the second primary gear plane.

11. The transmission according to claim 10, wherein a number of gear teeth of the first crawler shaft gearwheel differs from a theoretical number of gear teeth of the first crawler shaft gearwheel by at least one gear tooth, wherein the theoretical number of gear teeth is determined from a number of gear teeth of the first input gearwheel and of the first countershaft gearwheel, and from centre-to-centre distances between the gearwheels of the first primary gear plane, and wherein the number of gear teeth of the first crawler shaft gearwheel is smaller than the theoretical number of gear teeth of the first crawler shaft gearwheel, and the number of gear teeth of the second crawler shaft gearwheel is larger than the theoretical number of gear teeth of the second crawler shaft gearwheel.

12. The transmission according to claim 11, wherein one of the first and second countershaft gearwheels is rotationally fixed to the countershaft, and the other one of the first and second countershaft gearwheels is a rotatable countershaft gearwheel arranged rotatably on and selectively rotationally connectable to the countershaft, and wherein the rotatable countershaft gearwheel is located in the second primary gear plane.

13. The transmission according to claim 10, wherein a number of gear teeth of the first crawler shaft gearwheel differs from a theoretical number of gear teeth of the first crawler shaft gearwheel by at least one gear tooth, wherein the theoretical number of gear teeth is determined from a number of gear teeth of the first input gearwheel and of the first countershaft gearwheel, and from centre-to-centre distances between the gearwheels of the first primary gear plane, and wherein the number of gear teeth of the first crawler shaft gearwheel is larger than the theoretical number of gear teeth of the first crawler shaft gearwheel, and the number of gear teeth of the second crawler shaft gearwheel is smaller than the theoretical number of gear teeth of the second crawler shaft gearwheel.

14. A transmission control unit configured to control a transmission according to claim 5, wherein the transmission control unit is configured to control the countershaft gear engaging device to a neutral position when a direct forward gear of the transmission is engaged.

15. The transmission control unit according to claim 14, wherein the transmission control unit is further configured to control the transmission wherein the countershaft gear engaging device is configured to rotationally connect the rotatable countershaft gearwheel to the countershaft only when the crawler gear engaging device is in a neutral position, and wherein the crawler gear engaging device is configured to rotationally connect the first and second crawler shaft gearwheels to one another only when the countershaft gear engaging device is in a neutral position.

16. The transmission control unit according to claim 14 wherein the transmission control unit is further configured to control the transmission wherein the crawler and countershaft gear engaging devices are arranged to be movable in common by a single actuator.

17. The transmission control unit according to claim 14, wherein the transmission control unit is further configured to control the transmission wherein the crawler and countershaft gear engaging devices are selectively movable to a common neutral position in which the first and second crawler shaft gearwheels are rotationally disconnected from one another and in which the rotatable countershaft gearwheel is rotationally disconnected from the countershaft.

18. A vehicle comprising a transmission according to claim 1.

19. The vehicle according to claim 18, wherein:
the first primary gear plane comprises a first input gearwheel arranged coaxially with the input shaft, and a first countershaft gearwheel arranged on the countershaft; and
the second primary gear plane comprises a second input gearwheel arranged coaxially with the input shaft, and a second countershaft gearwheel arranged on the countershaft.

20. The vehicle according to claim 18, wherein the first crawler shaft gearwheel and the first countershaft gearwheel are in meshing engagement with one another, and wherein the second crawler shaft gearwheel and the second countershaft gearwheel are in meshing engagement with one another, or
wherein the first crawler shaft gearwheel and the first input gearwheel are in meshing engagement with one another, and wherein the second crawler shaft gearwheel and the second input gearwheel are in meshing engagement with one another.

* * * * *